United States Patent [19]

Arneth et al.

[11] 4,375,103
[45] Feb. 22, 1983

[54] METHOD AND APPARATUS OF SIGNALLING REQUEST TO SEND CLEAR TO SEND DELAY

[75] Inventors: August P. Arneth, Raleigh; Curtis L. Foshee, Cary, both of N.C.

[73] Assignee: International Business Machines Corp., Armonk, N.Y.

[21] Appl. No.: 187,901

[22] Filed: Sep. 17, 1980

[51] Int. Cl.³ .......................... H04L 7/00; H03K 1/17
[52] U.S. Cl. ................................. 375/109; 364/200; 375/121; 178/2 R
[58] Field of Search ...................... 178/2 R, 2 D, 2 E; 364/200 MS File; 370/110; 371/30, 32; 375/106, 109, 121

[56] References Cited

U.S. PATENT DOCUMENTS 4,009,336 2/1977 Saliga .............................. 370/110.2
4,156,277 5/1979 Seitz et al. ........................ 364/200
4,160,874 7/1979 Ollinger ............................ 178/2 R

OTHER PUBLICATIONS

Proceedings of the Fourth International Conference on Computer Communication, Kyoto, pp. 675–680, "Evolution Toward a Universal Interface for Data Communications".
IEEE Transactions on Communications, vol. COM-28, No. 4, Apr. 1980, pp. 433–444, Bertine, "Physical Level Protocols".

Primary Examiner—Benedict V. Safourek
Attorney, Agent, or Firm—E. H. Duffield

[57] ABSTRACT

Disclosed are a method and apparatus for exchanging information between a data terminal equipment (DTE) and data circuit terminating equipment (DCE) or controller connected to the data terminal equipment over a communications line. The specific information to be exchanged is the information indicating the delay period between a request to send received at the DCE and a clear to send condition occurring sometime later in response to the request to send. This function is normally handled by separate signalling lines, but for the so-called mini interface, no clear to send communication line exists. A method and apparatus employed in the present invention utilizes the transmitter signal element timing or clock line to convey the information from the DCE to the DTE. In response to receipt at the DCE of a request to send signal from the DTE, the DCE temporarily stops the transmitter signal timing clock, thus preventing the DTE from transmitting data. When the DCE modem has established carrier frequency and has completed its synchronization routine, a clear to send condition exists and the delay inherent between a request to send and clear to send signal is over. To signal this condition without the use of a clear to send signalling line, the DCE re-enables the transmitter signal element timing clock. The clock remains enabled at all times except during the request to send/clear to send delay period.

2 Claims, 2 Drawing Figures

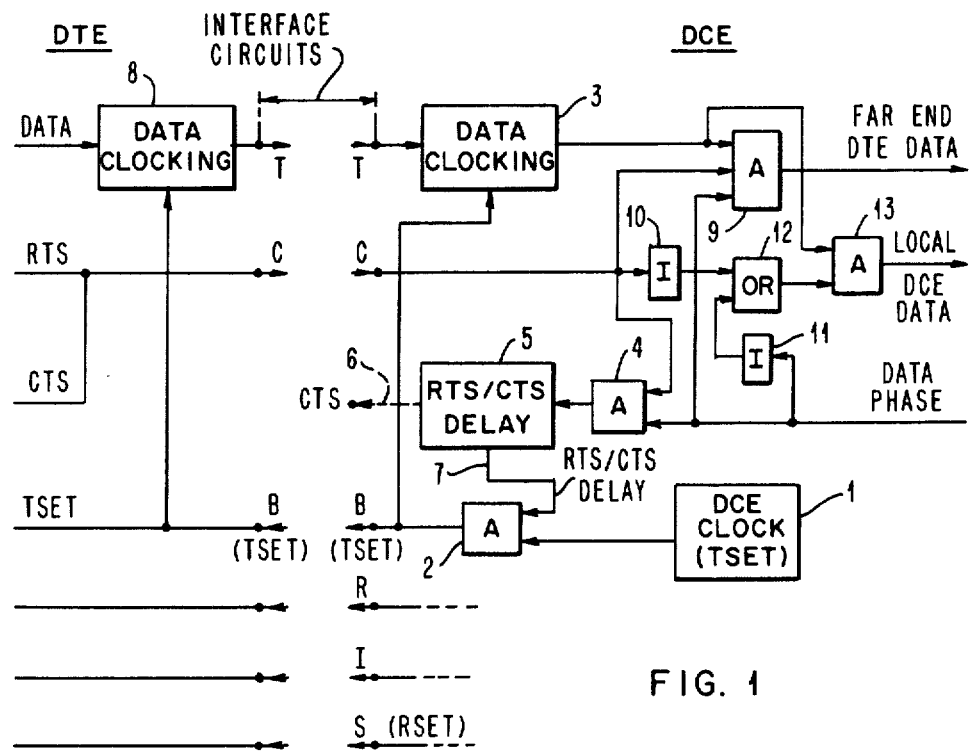
FIG. 1
FIG. 2
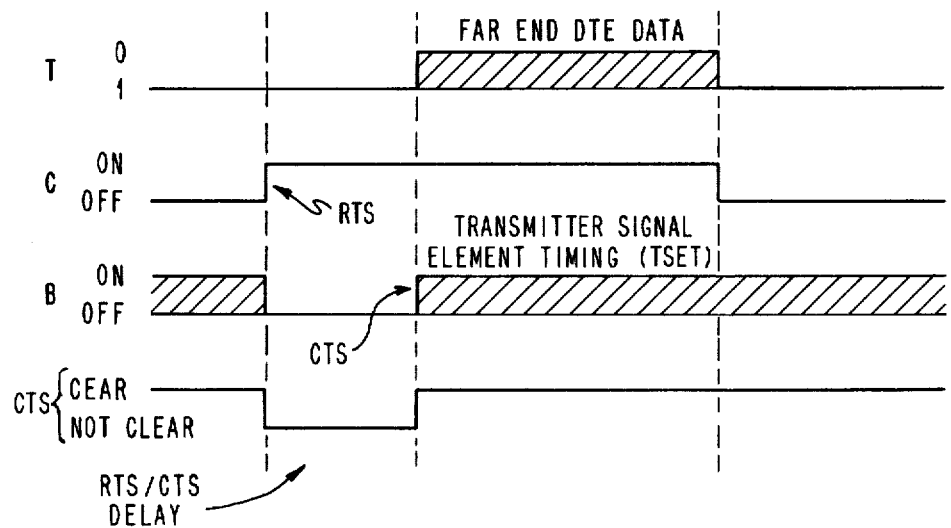

METHOD AND APPARATUS OF SIGNALLING REQUEST TO SEND CLEAR TO SEND DELAY

FIELD OF THE INVENTION

This invention relates to digital and analog communication equipment and to communication techniques for exchanging data and control information between two or more transmitter/receiver units linked on the communication medium. Specifically, it relates to the interface circuits between data terminal equipment and a modem connected together by a multi-line interface circuit.

PRIOR ART

Numerous interface specifications exist in the communications industry. Data sets or modems and similar interface equipment almost universally employ a separate signalling line at the interface to signal a delay period between the receipt of a request to send signal and a response with a clear to send signal. For example, numerous CCITT standards exist for defining various interface configurations and protocol conditions. Examples are the CCITT standard V.24/V.28, V.24/V.10, V.11, V.35, V.36, V.37 X.21BIS and X.20BIS. Also are the EIA standards including RS232C and RS449 to name but a few. RS-449 for example is entitled, "General Purpose 37 Position and 9 Position Interface for Data Terminal Equipment and Data Circuit Terminating Equipment Employing Serial Binary Data Interchange." RS-232-C is entitled, "Interface Between Data Terminal Equipment and Data Circuit Terminating Equipment Employing Serial Binary Data Interchange." The aforementioned published standards specify the functions and the number of lines defining an interface for attaching the specified types of equipment together over a communications link.

Numerous manufacturers offer interface equipment or modems which adapt to the interface requirements on one side and to a communications carrier line on the opposite or outbound side. An example would be the Bell data set 202C or 202D. This type of data set or modem is typical of the sort employing the RS-449 or RS-232-C interface standards. It employs means for indicating on a separate clear to send line the duration of the delay between the receipt of a request to send and the transmission of a clear to send signal between the DTE and the DCE.

A recent development is the so-called mini interface. This interface standard presently proposed does not include the additional clear to send signalling line. Some means must be provided for signalling this delay since the DCE will not instantly be ready to accept transmissions from a DTE over the communications link at the interface. Various proposed schemes have employed the concept of interrupting the transmitting clock line for control purposes. An example of the CCITT study group VII contributions #263 and 264 which utilize a concept of stopping the transmit clock for purposes of controlling the data terminal equipment. These proposals do not, however, address the signalling of the delay between a request to send and clear to send condition but are used for entirely different purposes.

Another prior approach is that of the Association Francaise de Normalisation contribution dated January, 1980 and relating to principles for the mini interface. This French contribution to the CCITT describes a concept similar to that of the present invention but in which the transmit clock is enabled only during the time transmission is to be permitted and is stopped at all other times. This approach does not signal the duration of the delay between a request to send and a clear to send condition and does not allow for the application of timing signals to the DTE for other purposes than transmission such as the clocking out of control data or other system synchronization and housekeeping routines that are often employed.

OBJECTS OF THE INVENTION

In light of the foregoing shortcomings of the known prior art, it is an object of the present invention to provide an improved signalling means and technique for exchanging duration of delay information between a DCE and a DTE relative to the delay period between a request to send and clear to send signal on an interface which does not include a separate line for indicating the clear to send condition.

Still another object of the present invention is to provide means for signalling the request to send clear to send delay and for controlling the operation of the DTE without requiring modification to the existing types of DTE equipment in order to conform them to the mini interface.

Still another object of the present invention is to provide a method universally compatible with a wide number of interface standard specifications and DTEs which will permit the implementation of mini interface systems interchangeably and without the necessity of modifying or adapting the DTEs.

SUMMARY

The foregoing and still other unenumerated objects of the present invention are met by providing at the DCE or modem special circuit means. This means is responsive to the receipt of a request to send signal at the interface to the DCE for temporarily interrupting the clocking signal line (and hence block the data transfer) from the DTE to the DCE. The interruption is for a period of time equal to the delay inherent between the receipt of a request to send signal and the achievement of the necessary conditions in preparation for sending the clear to send signal. Logic circuits included in the DCE respond to the request to send signal to open the clock line and prevent the issuance of clocking frequency pulses to the DTE over the interface thus blocking data transfer from the DTE. The DCE then is arranged to establish carrier and any synchronization or system format or protocol controls with the receiving station on the communications line followed by signalling a clear to send condition internally of itself.

Since there is no clear to send line emanating from the DCE over the interface attachment to the DTE, the clear to send signal is used internally for re-establishing or re-enabling the clocking function over the clock signalling line to permit data transfer from the DTE. Thus, the present invention operates by interrupting the clock line for a period of time equal to the delay between a request to send and clear to send signal condition. This has the effect both of preventing transmission from the DTE and of signalling to the DTE the duration of the delay period between request to send and clear to send signals without sending the clear to send signal itself.

BRIEF DESCRIPTION OF THE DRAWINGS

FIG. 1 is an overall schematic of a DTE and a DCE attached over an interface circuit of the mini interface type and also showing for the DCE the improved internal logic circuitry required for implementing the present invention.

FIG. 2 is a timing or state diagram for the operative method of the present invention together with the logic conditions of importance.

DETAILED SPECIFICATION

Turning to FIG. 1, the overall system of the present invention is schematically shown. The data terminal equipment abbreviated DTE is shown at the left of FIG. 1 and the data circuit terminating equipment abbreviated DCE, and usually including a modem or other similar signal processing functional element, is shown at the right abbreviated as DCE. An interface for connecting the DTE to the DCE consists of six lines as shown in FIG. 1. This is the so-called mini interface proposal and includes lines labeled T, C, B, R, I and S. The T line is the transmit data line; the C line is the control circuit lead; the B line is the transmitter signal element timing or clock line; the R line is the receive data line for the DTE; I is the status indicator lead for the DTE; and, S is the clock line for the receiving signal element timing function. For stopping the DTE and for signalling the duration of the request to send/clear to send delay, lines T, C and B require some further description. First, however, the DCE will be generally described.

In FIG. 1, the DCE includes an internal DCE clock 1 comprising a high frequency crystal controlled oscillator or the like with suitable count down circuitry (not shown) for establishing various clock pulse frequencies in a mamner well known in the art. This clocking frequency is normally applied to AND gate 2 and outputted to the interface on line B. It is also applied to the data clocking gate 3 for strobing the input of data from the DTE. Other logic circuit elements will be described later.

Moving to the DTE side of FIG. 1, it will be assumed that the transmitter signal element timing clock pulse stream is present on line B and that the DTE wishes to establish communications for the DCE over the transmit data line T. In this condition, the usual circuitry within the DTE (not forming a part of the present invention) will raise a signal on a request to send line, line C. This will be received over the interface at the DCE and several functions will occur.

At the DCE side, the signal for request to send appearing on line C is applied to AND gate 4. If the DCE is in a data receiving phase, i.e., is not engaged in exchange of protocol information, generation of carrier or other system functions, AND gate 4 will be fully enabled. This will trigger the request to send/clear to send delay circuit element 5 to operate. Circuit 5 normally employs a single shot and a resistor capacitor charge up or bleed down timing element which may be programably selected for the delay expected over the type of system or communication links that are employed. For example, a typical delay between a request to send and clear to send for a tributary station's initiation of communication over multi-point line is 25 msec. However, the delay between request to send and clear to send over a point to point line would typically be 65 msec. Depending upon the nature of the communication line and system configuration, the request to send/clear to send delay period will be different.

It is the standard practice in the art that most data sets or modems or other similar DCE equipment include specific means for indicating the exact duration of the delay experienced between the request to send and the clear to send. They utilize an internal signalling element 5 for generating a clear to send signal for application to an interface. However, in the case of the mini interface, there is no separate external clear to send line. This is indicated in FIG. 1 by the dashed line 6 labeled CTS.

It should be understood that this function, while normally included in DCEs, cannot be utilized on the mini interface. This signal is used, however, internally to apply to AND gate 2 a deconditioning signal on line 7 to interrupt passage of clock pulses from clock 1. When the clock pulses from clock 1 are interrupted, the DTE cannot receive clocking data over line B to clock out its messages for which permission to transmit was originally sought. Furthermore, the absence of the clock signal at the clocking gate 3 and prevents the reception if any were possible, of any incoming data to the DCE. Thus, it may be seen that once the request to send signal is detected, communication between the DCE and the DTE is effectively stopped insofar as recognition of any incoming data to the DCE or the permission of any outgoing data from the DTE is concerned. Once the request to send/clear to send delay period has expired and the DCE has established carrier frequency and synchronization, etc., the RTS/CTS delay line 7 can be re-enabled to enable AND gate 2 and permit the re-establishment of the clock on line B and at the data clocking gate 3.

Data clocking gate 8 at the DTE is then enabled by the receipt of incoming transmit signal element timing pulses on line B. The DTE then begins at once to transmit data over the transmit data line T. Additional logic elements are included at the DCE for sorting out incoming messages as destined for a far end DTE connected over some communication line to the DCE or to a local DCE depending on the status of the T and C lines at the interface. If the local DCE is in the data phase, and the control lead C is energized, an indication is made through AND gate 9 that data is intended for the far end DTE when gate 9 is fully enabled. Inverter circuits 10 and 11 operate through OR gate 12 and AND gate 13 to pass data inbound from the DTE through gate 3 to the local DCE whenever the control circuit lead is in a down condition or the DCE is not in the data phase but inbound data from the DTE is present.

Turning to FIG. 2, a timing diagram or state chart is illustrated for the method and apparatus described for FIG. 1. On the left of FIG. 2 are illustrated the 0 or 1 on or off conditions for lines T, C, and B in FIG. 1. When a request to send signal is generated as shown on the C line, the signal level on the C line is raised to the on condition. The result of this is that the transmitter signal element timing line B immediately goes to the off condition as the result of detection of the request to send at the DCE. The DCE commences its establishment of carrier frequency, and any initialization protocols or requirements necessary for synchronizing transmissions between the DCE and another remote DTE or the local DCE. When the request to send/clear to send delay period has ended, the transmitter signal element timing line B is re-enabled and transmission begins at once as shown by the line T in FIG. 2.

In the example given in FIG. 2, the data transmitted is intended for the far end DTE so the C line is maintained in an up or on condition. If the DTE wished to transmit to the local DCE, it would drop the C line at the beginning of transmission which would allow enabling AND gate 13 to pass the data to the local DCE. It may be seen in the bottom line of FIG. 2 that the request to send/clear to send delay timing, while not communicated over any separate line to the DTE, is nevertheless effectively understood and used at the DTE to control the clocking out of data on the T line. It can be logically used at the DTE for raising or lowering the C line depending upon whether the outbound data from the DTE is intended for a local DCE or for some far end DTE connected through the DCE.

As will be appreciated from the foregoing discussion, the clocking line has been effectively used to transfer transmitter clocking information from the DCE to the DTE and also to indicate to the DTE what the delay interval between RTS/CTS may be. This indication is under the control of the DCE but does not employ a separate CTS line so that the system is consistent with the so-called mini interface specification configuration. It will also be noted that no special circuitry is employed at the DTE and no modification of data terminal equipment are necessary in order to conform them to the mini interface. The logic modifications to the DCE or modem are relatively minor and involve the placement of the AND circuit 2 in a position to interrupt the clock frequency from clock 1 in response to the request to send clear to send delay signal normally generated internally in the DCE.

Having thus described our invention with respect to a detailed and preferred embodiment thereof, it will be instantly apparent to those skilled in the art that numerous equivalent configurations can be constructed without departing from the spirit and scope of the present invention.

Having thus described our invention, what we desire to protect by Letters Patent is:

1. In a data communications system interface defining the connection between two communicating terminals or systems comprising a local unit and a remote unit, and in which the communications interface includes a time clock signal output line and a request to send line but does not include a separate external control line for granting to a remote requesting station a clear to send authorization control signal, but does include a fixed delay period timing element for generating an internal clear to send authorization control signal responsive to the elapse of a fixed delay period the improvement comprising:

a transmission clock means resident in the local communications equipment and supplying clock signals to said clock signal output line;

means in said local unit for detecting a request to send input signal from the remote unit;

logic means in said local unit responsive to the request to send signal for interrupting said clock signals from emanating on said clock signal output line and for initiating said fixed delay period timing element and including means for indicating the completion of said fixed delay period; and responsive to an indication that said delay period has elapsed for passing said clocking signal to said line, thereby permitting said remote equipment to begin transmission.

2. In a data communications system interface defining the connection between two communications terminals or systems comprising a local unit and a remote unit, and in which the communications interface includes a timing clock signal output line and a request to send line but does not include a separate control line for granting to a remote requesting station a clear to send authorization control signal, an improved method of indicating the delay period between a request to send signal receipt and an establishment of carrier synchronization and frequency so that transmission may begin, comprising steps at said local unit of:

detecting a request to send input from said remote unit at said local unit;

initiating a delay period in response to detecting said request to send signal; and interrupting said timing clock signal output line in response to said receipt of request to send signal; and re-establishing said transmission clock signal output in response to the completion of said delay period, thereby permitting said remote equipment to begin transmission.

* * * * *